United States Patent [19]

Thomas

[11] Patent Number: 4,737,685

[45] Date of Patent: Apr. 12, 1988

[54] SEAL GLASS COMPOSITION

[75] Inventor: George L. Thomas, Lakewood, Ohio

[73] Assignee: General Electric Company, Schenectady, N.Y.

[21] Appl. No.: 931,598

[22] Filed: Nov. 17, 1986

[51] Int. Cl.⁴ .................. H01K 1/50; H01J 17/16; H01J 61/35; C03C 3/093

[52] U.S. Cl. .................................... 313/579; 313/636; 501/67

[58] Field of Search ............ 313/579, 636, 578; 501/67–72, 102, 105, 103, 10

[56] References Cited

U.S. PATENT DOCUMENTS

| | | | |
|---|---|---|---|
| 3,496,401 | 2/1970 | Dumbaugh, Jr. | 313/579 |
| 4,060,423 | 11/1977 | Thomas | 501/70 |
| 4,192,689 | 3/1980 | Rinehart | 501/72 |
| 4,238,705 | 12/1980 | Thomas | 313/579 |
| 4,409,516 | 10/1983 | Thomas | 313/579 |

Primary Examiner—Theodore M. Blum
Assistant Examiner—Gregory C. Issing
Attorney, Agent, or Firm—Philip L. Schlamp; Edward M. Corcoran; J. F. McDevitt

[57] ABSTRACT

An aluminosilicate glass composition is disclosed which is particularly useful for direct fusion sealing to both molybdenum and tungsten metals. The present glass composition provides an improved high temperature lamp envelope by reason of its reduced seed or bubble content. A minor amount up to approximately 3 weight percent $ZrO_2$ is included in the glass as a refining agent to reduce the glass seed count and the glass further exhibits a higher strain point for less stress when the high temperature lamps are operated.

16 Claims, 1 Drawing Sheet

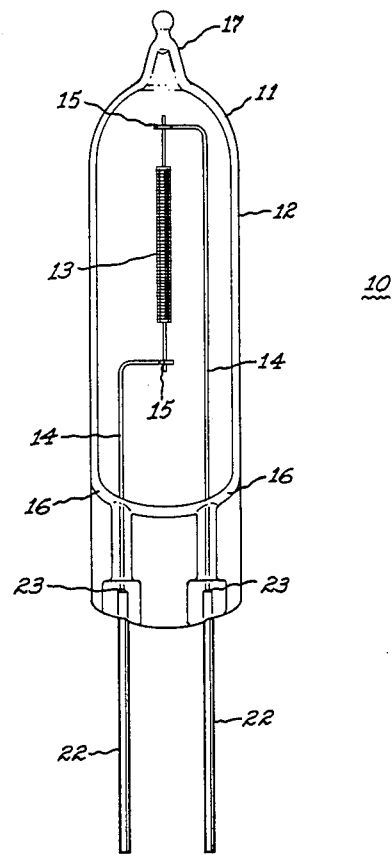

SEAL GLASS COMPOSITION

BACKGROUND OF THE INVENTION

In my earlier U.S. Pat. No. 4,238,705 there is disclosed an aluminosilicate glass composition useful in high temperature lamps and consisting essentially of oxides in approximate percent by weight 54–71 $SiO_2$, 12–18 $Al_2O_3$, 4–8 CaO, 10–23 BaO, and 0–3 $R_2O$ wherein R is an alkali metal ion, along with minor amounts of incidental impurities, residual fluxes, and refining agents. The aggregate $SiO_2$ and $Al_2O_3$ content in said prior art glass lies within the approximate range 73–83 weight percent, the aggregate BaO and CaO content lies within the approximate range 17–30 weight percent and the weight ratio between BaO and CaO lies within the approximate range 2.3–3.5 to provide improved reboil resistance. The average thermal co-efficient of expansion for said prior art glass in the 0°–300° C. temperature range lies between about $37 \times 10^{-7}$ cm./cm./°C. to about $50 \times 10^{-7}$ cm./cm./°C. for direct sealing to the lamp glass envelope of the lamp inleads which can be either tungsten or molybdenum metal. The regenerative halogen cycle lamp described in this patent further discloses a utilization of larger diameter inleads being joined to said tungsten or molybdenum lamp inleads in the press seal region as a means for improving the mechanical support of said lamp.

It is now been discovered that still further improvements for said type incandescent lamp construction can be provided with only a relatively minor modification being made to the glass composition. More particularly, it has been found that relatively minor amounts of $ZrO_2$ addition in said glass composition produces a significant reduction in the seed count of the molten glass when refined and thereafter drawn into tubing thereby improving the mechanical strength and optical clarity of the lamp glass envelope using said modified glass composition. This effect was unexpected since $ZrO_2$ has not been recognized previously as a glass refining agent. An addition of $ZrO_2$ in minor amounts to this aluminosilicate glass further raises the strain point desirably without unduly causing its devitrification during the glass forming procedure. The strain point elevation is desirable since the glass envelope in a high temperature lamp can develop permanent stresses on heating and cooling during on and off cycles of the lamp operation. Since these lamps are usually under pressure of several atmospheres when operated, a higher strain point in said lamp glass envelope lessens its prospects for mechanical failure due to any permanent stress condition developed when the lamp is operated.

Accordingly, the present invention relates to an improved seal glass composition which has been found particularly useful to provide the hermetic seal means for an incandescent lamp being operated at elevated temperatures often exceeding 500° C. and higher. Said type incandescent lamp designs require a transparent envelope material capable of withstanding these elevated temperatures and wherein said envelope is also sealed hermetically to the electrical inleads. Among these lamp types is a regenerative cycle halogen containing lamp wherein a resistive incandescent filament providing the light source in said lamp is joined at each end to an inlead and with both of said inleads being fusion sealed directly to the lamp glass envelope. Lamps having said structural configuration are now widely being employed in a variety of lighting applications including projector lamps, automotive headlamps and even household illumination sources. In said product applications, the regenerative halogen cycle lamp can be mounted in an outer reflector member but can also simply be contained within an outer glass envelope.

SUMMARY OF THE INVENTION

It is an object of the present invention, therefore, to provide an improved aluminosilicate seal glass which is especially useful as the envelope material in high temperature lamps. It is a further objective to provide an improved aluminosilicate glass which can be manufactured more readily, thereafter be used for hermetic sealing of molybdenum or tungsten lamp inleads, and which is not as susceptible to thermal stress development. A still further important objective is to provide an improved incandescent lamp utilizing said aluminosilicate glass which better resists mechanical failure by reason of eliminating the seeds or bubbles found in the prior art glass compositions.

Briefly, the present glass composition consists essentially of oxides as calculated from the starting batch materials in approximate percents by weight 52–72 $SiO_2$, 12–17 $Al_2O_3$, 10–23 BaO, 4–8 CaO and further containing from a minor amount up to about 3 $ZrO_2$ sufficient to reduce the seed count in said glass composition, along with minor amounts of incidental impurities, residual fluxes and refining agents. Said seal glass composition exhibits a strain point of at least 730° C., a liquidus temperature not exceeding 1320° C., and an average thermal coefficient of expansion in the 0°–300° C. temperature range between about $37 \times 10^{-7}$ cm./cm./°C. to about $48 \times 10^{-7}$ cm./cm./°C. The aggregate $SiO_2$ and $Al_2O_3$ content in said glass composition lies within the approximate range 70–83 weight percent, the aggregate BaO and CaO content lies within the approximate range 17–30 weight percent, and the weight ratio between BaO and CaO lies within the approximate range 2.3–3.5 to provide improved reboil resistance when a hermetic seal is formed during subsequent incandescent lamp manufacture. A preferred glass composition for sealing directly to tungsten metals contains an aggregate BaO and CaO content lying in the approximate range 17–21 weight percent and exhibits an average coefficient of linear thermal expansion in the 0°–300° C. temperature range between about $37 \times 10^{-7}$ cm./cm./°C. up to about $41 \times 10^{-7}$ cm./cm./°C. for direct sealing to tungsten metals. A different preferred glass for sealing directly to molybdenum metals contains an aggregate BaO and CaO content which lies in the approximate range 21–30 weight percent and exhibits an average coefficient of linear thermal expansion in the 0°–300° C. temperature range between about $41 \times 10^{-7}$ cm./cm./°C. up to about $48 \times 10^{-7}$ cm./cm./°C.

$ZrO_2$ addition in the above defined minor amounts imparts a dramatic seed count reduction when the glass is melted without adversely affecting either physical properties desired when the molten glass is thereafter formed into the desired lamp shape or in the final lamp device. For example, a 1% $ZrO_2$ addition was found to lower the seed count more than 30% in crucible melts and with said seed count being reduced 94% as compared with conventional glass in a 600 pound day tank melt after a 24 hour melting period. The desirable strain point increase in the final lamp member has been found to be approximately 10° C. for each percent of $ZrO_2$ addition but with a $ZrO_2$ addition beyond 2 weight percent also causing an increase in the glass liquidus temperature. A maximum 3 weight percent $ZrO_2$ addition in said glass composition is thereby maintained to avoid raising the glass liquidus temperature beyond the point where devitrification is occasioned when the molten glass is being formed into the desired lamp shape. Accordingly, the maximum 3 weight percent $ZrO_2$ achieves a 30° C. increase of the glass strain point accompanied by significant seed reduction in the final lamp glass member.

BRIEF DESCRIPTION OF THE DRAWING

The accompanying drawing is a side elevation view of one type regenerative cycle incandescent lamp embodying the improved glass to metal seal formed according to the present invention.

DESCRIPTION OF THE PREFERRED EMBODIMENTS

Referring to the accompanying drawing, there is depicted a typical regenerative cycle halogen lamp 10 having a transparent glass envelope 11 formed from a tube 12 of the present aluminosilicate glass. Within said glass envelope there is contained a resistive incandescent filament 13 connected to inlead wires 14 by hooks or clamps 15. Said inlead wires 14 utilize a refractory metal selected from molybdenum or tungsten and the light source coil 13 can be suspended by said inleads along the central lamp axis as shown or transverse thereto. A multi-filament light source employing inlead pairs within the lamp glass envelope is also known as disclosed in the previously mentioned U.S. Pat. No. 4,238,705 patent. In the presently depicted lamp embodiment, the lamp glass envelope is closed at one end with the customary pinch seal 16 while the opposite end is closed by an also customary tipped-off residue 17. The lamp is flushed and filled with a halide gas mixture at the tipped-off end which is maintained open while the press seal is being formed during lamp manufacture. The exterior most end of each lamp inlead 14 is hermetically sealed at the press seal region 16 of the lamp glass envelope and further joined by conventional means such as brazing or welding to relatively larger diameter inlead wires 22. The welded or brazed junctions 23 are desirably located beyond the press seal, however, so that less costly metals having higher thermal expansion such as Kovar ® type alloys and silicon-iron alloys can provide the structural support means for said lamp device.

Preferred glasses according to the present invention are reported in the Table below. As is common in glass technology, the glass compositions are reported in terms of oxides as calculated from the batch starting materials. Although there may be minor differences between the glass composition as calculated in said the conventional manner from the batch constituents and any actual glass composition obtained therefrom, both compositions will be essentially the same. There is only slight volatilization of the batch constituents in the present glass composition during melting and which can be accompanied by trace pick-up of zirconia and alumina or other consituents from the refractories ordinarily employed to melt the glass. Consequently, the present invention contemplates use of a glass composition for the herein described hermetic seal improvement having the same composition ranges above set forth as calculated in the conventional manner from the starting batch formulations.

TABLE

| Weight Percent | #1 | #2 | #3 | #4 |
|---|---|---|---|---|
| $SiO_2$ | 60.4 | 59.5 | 59.0 | 57.7 |
| BaO | 18.4 | 18.4 | 18.4 | 18.4 |
| $Al_2O_3$ | 14.4 | 14.3 | 14.3 | 13.9 |
| CaO | 6.6 | 6.6 | 6.6 | 6.8 |
| $ZrO_2$ | 0 | 1.0 | 1.5 | 3.0 |
| $TiO_2$ | 0.2 | 0.2 | 0.2 | 0.2 |
| Liquidus Temp. (°C.) | 1221 | 1226 | 1232 | 1280 |
| Softening Pt. (°C.) | 1012 | 1013 | 1017 | — |
| Anneal Pt. (°C.) | 783 | 790 | 793 | 812 |
| Strain Pt. (°C.) | 733 | 739 | 742 | 763 |
| Coeff. Exp ($\times 10^{-7}$/°C.) (0–300° C.) | 45.0 | 45.0 | 45.1 | — |

As can be noted from the foregoing Table, a comparison is provided between the prior art aluminosilicate glass as disclosed in the aforementioned U.S. Pat. No. 4,238,705 (Example 1) and improved $ZrO_2$ containing modifications made in said glass composition (Examples 2–4). All $ZrO_2$ containing glasses according to the present invention exhibit higher strain points than the prior art glass while maintaining a thermal coeficient of expansion suitable for direct hermetic sealing to molybdenum metals. It can further be noted from said comparison that $ZrO_2$ additions in minor amount have not also raised the anneal point or softening point in the modified glass to a degree significantly impairing the desired sealing characteristics. The presently improved glass composition is further amendable to incorporation of minor amounts of still other optional oxides, such as up to 0.5 weight percent $TiO_2$, which can desirably absorb UV radiation being emitted from a lamp device. Still other oxides such as SrO and MgO can be either added or be found in the glass as minor constituents without detrimental effect upon the desired physical behavior. For example, about 0.3 weight percent SrO can be introduced into the glass without deleterious effect as a contaminant from the barium carbonate source material now commonly employed in the manufacture of this type glass. Small amounts of MgO added to this glass can also prove beneficial in reducing the liquidus temperature but if more than a 1% addition is employed the liquidus temperature rises rapidly along with scum build-up on the glass melt surface.

It will be apparent from the foregoing description, that a novel seal glass composition has been provided affording significant improvement in the direct hermetic sealing to both tungsten and molybdenum metals. It will also be apparent that minor variations in the disclosed glass composition other than above specifically disclosed are contemplated without departing from the spirit and scope of the present invention. It is intended to limit the present invention, therefore, only by the scope of the following claims.

What I claim as new and desire to secure by Letters Patent of the United States:

1. An improved seal glass composition which consists essentially of metal oxides as calculated from the starting batch of materials in the approximate percents by weight 52-70 $SiO_2$, 12-17 $Al_2O_3$ 10-23 BaO, 4-8 CaO, and further containing from about 1-3 $ZrO_2$ sufficient to reduce the seed count in said glass composition, along with minor amounts of incidental impurities, residual fluxes and refining agents.

2. A seal glass composition as in claim 1 having a strain point of at least 730° C., a liquidus temp not exceeding 1320° C., and an average thermal coefficient of expansion in the 0°-300° C. temperature range between about $37 \times 10^{-7}$ cm./cm./°C. to about $48 \times 10^{-7}$ cm./cm./°C.

3. A seal glass composition as in claim 1 wherein the aggregate $SiO_2$ and $Al_2O_3$ content lies within the approximate range 70-83 weight percent, the aggregate BaO and CaO content lies within the approximate range 17-30 weight percent, and the weight ratio between BaO and CaO lies within the approximate range 2.3-3.5 to provide improved reboil resistance.

4. A seal glass composition as in claim 1 wherein the aggregate BaO and CaO content lies in the approximate range 17-21 weight percent and exhibits an average coefficient of linear thermal expansion in the 0°-300° C. temperature range between about $37 \times 10^{-7}$ cm./cm./°C. up to about $41 \times 10^{-7}$ cm./cm./°C. for direct sealing to tungsten metals.

5. A seal glass composition as in claim 1 wherein the aggregate BaO and CaO content lies in the approximate range 21-30 weight percent and exhibits an average coefficient of linear thermal expansion in the 0°-300° C. temperature range between about $41 \times 10^{-7}$ cm./cm./°C. up to about $48 \times 10^{-7}$ cm./cm./°C. for direct sealing to molybdenum metals.

6. A seal glass composition as in claim 5 wherein the BaO content exceeds the $Al_2O_3$ content.

7. An improved incandescent lamp having a transparent glass envelope which contains a resistive incandescent filament connected to a pair of conductive metal inlead wires, said glass envelope having an average thermal coefficient of expansion in the 0°-300° C. temperature range between about $37 \times 10^{-7}$ cm./cm./°C. up to about $48 \times 10^{-7}$ cm./cm./°C., and said inlead wires being further hermetically sealed directly to said glass envelope, wherein the improvement comprises employing a glass composition for said glass envelope which consists essentially of metal oxides as calculated from the starting batch materials in the approximate percents by weight 52-70 $SiO_2$, 12-17 $Al_2O_3$, 10-23 BaO, 4-8 CaO and further containing from about 1-3 $ZrO_2$ sufficient to reduce the seed count in said glass composition along with minor amounts of incidental impurities, residual fluxes and refining agents.

8. An improved lamp as in claim 7 wherein the hermetic sealing is a press seal.

9. An improved lamp as in claim 7 wherein said glass composition further exhibits a strain point of at least 730° C. and a liquidus temperature not exceeding 1320° C.

10. An improved lamp as in claim 7 wherein said glass composition has an aggregate $SiO_2$ and $Al_2O_3$ content which lies within the approximate range 70-83 weight percent, an aggregate BaO and CaO content which lies within the approximate range 17-30 weight percent, and a weight ratio between the BaO and CaO contents which lies within the approximate range 2.3-3.5 to provide improved reboil resistance.

11. An improved lamp as in claim 7 wherein said glass composition has an aggregate BaO and CaO content which lies within the approximate range 17-21 weight percent and exhibits an average coefficient of linear thermal expansion in the 0°-300° C. temperature range between about $37 \times 10^{-7}$ cm./cm./°C. up to about $41 \times 10^{-7}$ cm./cm./°C. for direct sealing to lamp inlead wires formed with a tungsten metal.

12. An improved lamp as in claim 7 wherein said glass composition has an aggregate BaO and CaO content which lies within the approximate range 21-30 weight percent and exhibits an average coefficient of linear thermal expansion in the 0°-300° C. temperature range between about $41 \times 10^{-7}$ cm./cm./°C. up to about $48 \times 10^{-7}$ cm./cm./°C. for direct sealing to lamp inlead wires formed with a molybdenum metal.

13. An improved lamp as in claim 12 wherein said glass composition has a BaO content which exceeds the $Al_2O_3$ content.

14. An improved lamp as in claim 7 wherein the incandescent lamp is a regenerative cycle halogen lamp and the inleads connected to the resistive incandescent filament are molybdenum or tungsten.

15. An improved lamp as in claim 7 wherein the inlead wires are joined to larger diameter inlead wires having greater thermal expansion characteristics in the hermetic seal region.

16. An improved lamp as in claim 15 wherein the larger diameter inleads are formed with an iron alloy.

* * * * *